Aug. 8, 1944.   F. M. SMITH   2,355,568
VIBRATION DAMPED PANEL
Filed May 29, 1941
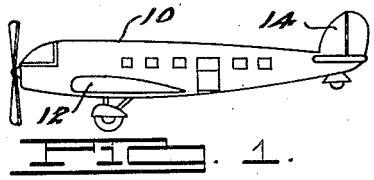
FIG. 1.
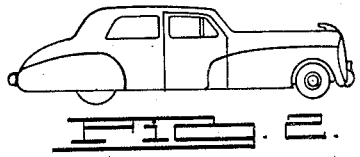
FIG. 2.
FIG. 3.
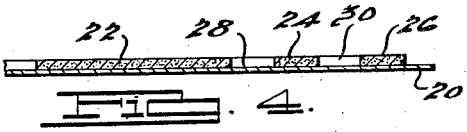
FIG. 4.
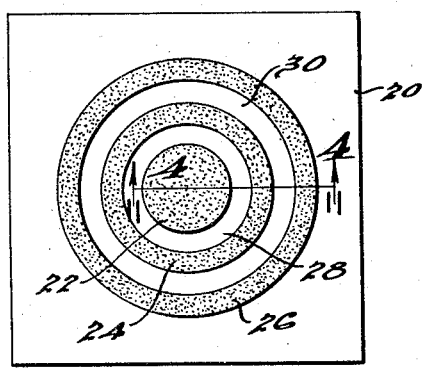
FIG. 6.
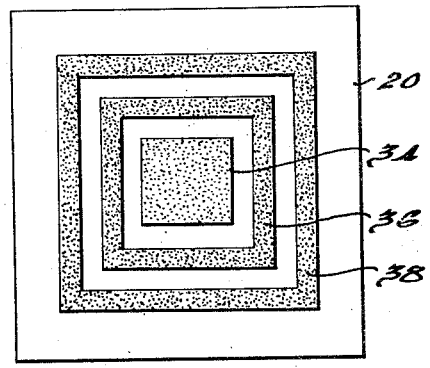
FIG. 5.
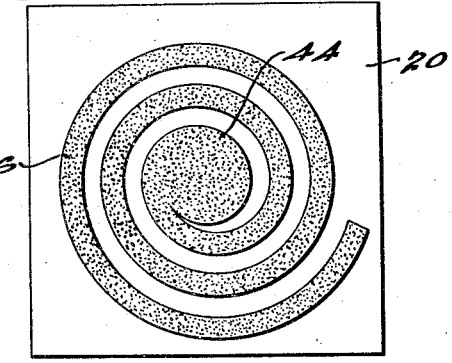
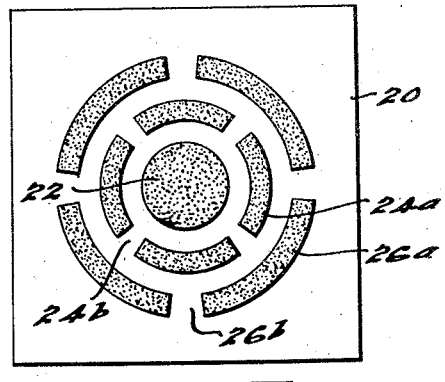
FIG. 7.
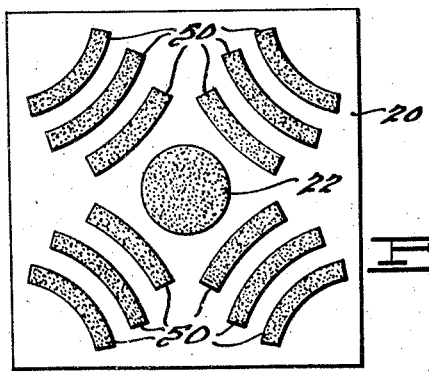
FIG. 8.
INVENTOR
Frank M. Smith
BY
Harness, Dickey & Pierce
ATTORNEYS.

Patented Aug. 8, 1944

2,355,568

UNITED STATES PATENT OFFICE 2,355,568

VIBRATION DAMPED PANEL

Frank M. Smith, Dearborn, Mich., assignor, by mesne assignments, to Consolidated Aircraft Corporation, San Diego, Calif.

Application May 29, 1941, Serial No. 395,895

9 Claims. (Cl. 154—44)

This invention relates to the insulation of vibratable metallic panels and has for its principal object the arrangement of insulation material on such panels in such a manner as to enable a minimum weight of insulation material to be employed to effect the desired results.

Objects of the invention include the provision of a thin metallic panel having insulation material adhered thereto in such a manner as to enable the vibration of the panel to be dampened without fully covering the surface thereof with the insulation material; the provision of a thin metal panel as above described in which the insulation material is applied in areas spaced from one another by areas substantially devoid of insulation; the provision of a construction as above described in which the insulation stops short of the outer edges of the panel insulated thereby; the provision of a construction as above described in which the areas of insulation are applied in sizes bearing a predetermined relation with respect to the size of the panels dampened thereby; the provision of a thin sheet metal panel having insulation material applied thereto to provide a central spot and outwardly directed areas spaced from one another outwardly from said central spot by areas of said panel substantially devoid of insulation; and the provision of a construction as above described in which the central spot of insulation is surrounded by encompassing strips spaced from one another and from the central spot and dimensioned in a predetermined relation with respect to the dimensions of the sheet.

The above being among the objects of the present invention the same consists in certain novel arrangements of insulation material on thin sheet metal panels and to such panels insulated thereby to be hereinafter described with reference to the accompanying drawing and then claimed, having the above and other objects in view.

In the accompanying drawing which illustrates suitable embodiments of the present invention and in which like numerals refer to like parts throughout the several different views, Fig. 1 is a side elevational view of an airplane having thin sheet metal panels of a character adaptable to the use of the present invention;

Fig. 2 is a side elevational view of an automobile having thin sheet metal panels adaptable to the use of the present invention;

Fig. 3 is a plan view of a thin sheet metal panel having insulation material applied thereto in accordance with the present invention;

Fig. 4 is an enlarged fragmentary, vertical sectional view of the panel shown in Fig. 3 and taken on the line 4—4 thereof; and, Figs. 5, 6, 7 and 8 are views similar to Fig. 3 but illustrating different arrangements of insulation material thereon for obtaining the desired result in accordance with the practices of the present invention.

It is well understood that thin sheet metal panels when forming part of a structure subject to vibratory movements and when unsupported between their edges are often caused to vibrate in sympathy with the vibrations of the structure and to such an extent as to be audible. It is common practice to dampen the vibrations of such panels below the audible range by applying a sound insulation material thereto. Such sound insulation material may take the form of sheets of suitable sound deadening composition preformed and secured to the panel by a suitable adhesive, or it may take the form of a flowable composition of relatively high viscosity but yet of sufficiently low viscosity as to permit it to be sprayed upon the panels by the use of spray guns or the like. The latter material has sufficient adhesive qualities of its own to cause it to adhere to the panel when sprayed thereon and is generally recognized as being superior to the preformed type in dampening effect for equal thicknesses of material and is considerably more economical to apply in that it involves materially less labor in application than the first type.

In dampening panels as above described it has heretofore been the practice to apply such materials solidly over the greater proportion if not all of the area of the panel to be dampened thereby. As a result and inasmuch as such material to be effective must be relatively heavy, when a sufficient amount of the same has been applied to a panel in a conventional manner the effective weight of the panel is materially increased.

The weight involved in thus insulating a panel of an airplane by applying insulation material thereto in a conventional manner is so great as to be substantially prohibitive in many cases and it was as a result of attempts to overcome this disadvantage as applied to the insulation of airplane panels that the present invention was evolved. By the use of the present invention such panels may be suitably insulated against vibration by the employment of a materially less amount of insulation than would be employed in accordance with conventional methods, in fact by the employment of approximately 50% or less of the insulation material in some cases as compared to conventional methods. While the weight of such insulation on the panels of automobile bodies and the like when applied in accordance with conventional practices is of no great disadvantage, particularly as compared to the aircraft field, nevertheless by the use of the present invention in connection with the panels of automobile bodies and the like the amount of insulation may be substantially reduced and, therefore, the cost of insulation of the body substantially reduced and which, of course, is a material advantage in any event.

In accordance with the present invention the insulation is applied to the panel in spaced areas spaced from one another by areas of substantially bare panel, in other words by areas substantially devoid of insulation. These areas of insulation material are preferably arranged in a direction substantially perpendicular to the path of the vibration in the panels to be insulated. As is commonly understood the vibrations in thin sheet metal panels appear to radiate outwardly from the center thereof and, accordingly, in accordance with the present invention the separated areas of insulation material are preferably disposed in a direction transverse to lines extending radially from the center of the panel. Preferably a spot of such insulation is applied to the center of the panel as this is the point of maximum amplitude of vibration in such panels and, if desired, the successive areas of insulation outwardly from the center may successively decrease in thickness in a manner somewhat corresponding to the decrease in amplitude of the vibration which would otherwise be present in the panel. Obviously the areas of insulation may be applied in a multitude of different shapes and arrangements. Perhaps the simplest and yet apparently the most efficient form is to arrange the central spot of such material as a disc and the areas spaced outwardly therefrom and from each other in the form of spaced concentric rings. The rings may, of course, be continuous or interrupted. Instead of rings the insulation may be applied in the form of rectangular strips, it may be arranged in the form of a spiral strip having its center at the center of the panel, or in any one of a number of different arrangements. It will also be appreciated that the invention is applicable to panels which are square, rectangular or shaped otherwise, but for the purpose of illustration the panels illustrated in the accompanying drawing are shown as square panels for the purpose of simplicity in description.

Referring now to the accompanying drawing in Fig. 1 is illustrated an airplane having a fuselage 10, wings 12 and tail surfaces 14. All of these parts may involve thin metal panels subject to audible vibration and, accordingly, which may be benefited by the use of the present invention, although it will be appreciated that ordinarily it will only be those panels in the fuselage 10 that will require damping to prevent audible vibration thereof in order not to disturb the passengers. However, it will be appreciated that the vibration of such panels, particularly at a high rate, is not desirable in any case whether audible or not as it may tend to effect crystalization of the metallic structure of the panel and hasten its eventual destruction, and for that reason it may be desirable under some conditions to apply the insulation to panels other than in the fuselage 10 itself.

The automobile illustrated in Fig. 2 is assumed to be a conventional automobile, various thin metal panels of the body of which may be subject to the type of vibration above referred to and which, therefore, require insulation in order to make the body quiet as is well understood in the art. It will, of course, be appreciated that objects other than airplanes or automobiles having thin sheet metal panels subject to vibratory influences may also be benefited by the use of the present invention although not specifically enumerated.

Referring now to Figs. 3 and 4 the panel 20 there shown is assumed to represent a panel which may be employed on the airplane shown in Fig. 1, the automobile shown in Fig. 2 or any other object or device which may be equipped with such panel. While the present invention may be applied to panels of any shape and size subject to vibration in use the panel 20 is shown square merely as a matter of illustration. The thickness of the panel may, of course, vary considerably. For instance when employed in an automobile body such panels will usually be in the neighborhood of twenty one-thousandths of an inch in thickness, whereas when employed in an airplane they may be anywhere from five one-thousandths to fifteen one-thousandths of an inch or more in thickness. The panel 20 may, of course, be constructed of different metals or alloys.

In any event the panel 20 in accordance with the present invention is provided centrally thereof with a disc 22 of insulation material suitably adhered thereto. Concentric with the disc 22 and outwardly spaced therefrom is a ring 24 of insulation material and concentric with the ring 24 and outwardly spaced therefrom is a second ring 26 of insulation material, both rings 24 and 26, of course, being suitably adhered to the surface of the panel 20. The space or area 28 spacing the disc 22 from the ring 24 in accordance with the present invention is entirely or substantially entirely devoid of insulation as is also the space 30 separating the rings 24 and 26 and the space outwardly of the ring 26 is also entirely or substantially entirely devoid of such insulation. The insulation material may be preformed and suitably adhered in place but preferably is of the second type above described which is simply sprayed on the panel preferably by the use of a suitable stencil plate or the like, as this last type of insulation is more effective for a given thickness as compared to the first type and, being capable of being sprayed into position, involves much less labor in its application. This last type of insulation referred to is conventional and several different types thereof are available on the market so that no dicussion of the actual composition of the various types is believed necessary.

As previously mentioned, if desired the thickness of the disc 22 may be greater than the thickness of the ring 24 and likewise the thickness of the ring 24 may be greater than the thickness of the ring 26, in a manner more or less corresponding with the variations in the amplitude of vibration of the panels when uninsulated and vibrating. Ordinarily, however, the application of the insulation to the panel in approximately equal thicknesses throughout will be found satisfactory.

The thickness of the insulation may, of course, vary according to the thickness of the panel to which it is applied, according to the size of the panel, according to the particular metal from which it is formed and the characteristics of such metal, and according to the vibratory influences to which it is subjected. Generally speaking the thicker the panel the less amount of insulation required. The actual amount of insulation required to obtain the desired result on any particular panel in any instance may be readily determined by experimentation as it is difficult to make any hard and fast rules because of the unlimited variations in conditions arising because of variations in shape and sizes of panels and the characteristics of the metal from which they are formed, as well as to the nature of the vibratory influences to which they will be subjected to in service.

It will, of course, be appreciated that in the broader aspects of the invention and with particular reference to the construction illustrated in Figs. 3 and 4 the diameter of the central disc 22 and the thickness and number of the rings 24 and 26, as well as the spacing of the various rings from each other and of the inner ring from the disc 22, may vary greatly. As a matter of illustration I have found that in panels approximately two feet square and in rectangular panels two feet wide and formed from stainless steel 0.005" in thickness and employing a standard spray on type of insulation material thereon weighing 13.25 pounds per gallon, if the insulation is applied in the ratio of 0.015 pound of insulation per one square foot of area of the panel satisfactory results are obtained. Under such conditions I have found that where the insulation is applied with the diameter of the disc 22 and thicknesses and spacings of the rings 24 and 26 as that shown in Fig. 3 a satisfactory result is obtained. It may be noted that in Fig. 3 the diameter of the disc 22 is approximately equal to one-fourth of the width of the panel 20, the outer diameter of the outer ring 26 is approximately equal to three-quarters of the width of the panel 20 and the width or radial dimension of the rings 24 and 26 and the spacing of these rings from the disc 22 and from each other is approximately equal to $\frac{1}{16}$ of the width of the panel 20. By employing these ratios satisfactory results are obtained, and these ratios constitute a more limited phase of the present invention. Where a panel corresponding to the panel 20 is not square but is rectangular, for instance, the circular arrangement of the discs and rings may still be retained if desired or they may be elongated in the direction of the greater dimension of the panel under such conditions if desired. In other words, assuming that the panel 20 is made longer than it is wide, then the disc 22 and rings 24 and 26 may be stretched out in the direction of the length of the sheet as ellipses. The dimension of the central disc or spot 22 and the rings 24 and 26 measured in the direction of the length of such rectangular panel preferably bearing the same ratio to such length as above set forth while retaining the dimensions above mentioned over the width of the sheets assuming the sheets remain of the same width. Where the panel is not of uniform width, then its average width may be employed in arriving at the dimensions of the various elements and spacings in accordance with the proportions above stated.

It is generally understood that the vibrations in a panel such as the panel 20 when vibrating radiate outwardly and in all directions from the center thereof. The disc 22 being preferably at the actual center of the disc and the rings 24 and 26 being disposed transversely of the path of such vibrations outwardly from the center, serve to intercept these vibrations and dampen them out. The development of the present invention has proven that the application of a solid coating of such insulation to such panels is not necessary but is a disadvantage not only from the standpoint of involving excessive weight but also from the standpoint of involving excessive cost. Accordingly, it will be appreciated that by the practices of the present invention both the weight of and the cost of insulated panels may be materially reduced as compared to previous constructions.

It will, of course, be appreciated that a solid layer of insulation of the same thickness as that employed in the particular example described and overlying the whole or major portion of the panel would be just as effective from a vibration damping standpoint as the arrangement shown and described but would be heavier and be more expensive. It will also be appreciated that the spaces 28 and 30, and the space outwardly of the outer ring 26 may have a relatively light coating of insulation thereon without materially altering the intent of the present invention. In other words, in the following specification and claims the term "substantially devoid of insulation material" is intended to mean that the spaces such as the spaces 28 and 30 do not have a coating of insulation material of sufficient thickness to materially aid in the damping of the panel.

In Figs. 5 to 8, inclusive, various modifications of the arrangement of the insulation shown applied to the panel 20 in Fig. 3 are illustrated. In each of these cases the panel is shown as being square under which conditions the application of the insulation thereto in accordance with the formula above given for a reasonable application thereof results in substantially the arrangement shown in each case. It will be appreciated, of course, that where the panel is not square but is of some different shape the same arrangement shown may be employed or the arrangement and width of the various strips or areas of insulation may be proportionally increased in the direction of the longer dimension of the panel. The panel in each of Figs. 5 to 8, inclusive, may be assumed to be the same panel 20 as employed in Fig. 3 and, therefore, the only change being in the arrangement of the insulation itself.

In Fig. 5 instead of arranging the insulation in circular conformation it is arranged square. In other words the central spot instead of being a disc, as the disc 22 in Fig. 6, is a solid square 34 and in accordance with a more limited phase of the present invention its edge dimensions may be equivalent to the diameter of the disc 22 in Fig. 3 in relation to the dimensions of the panel, in other words equal to one-quarter of the dimension of the sides of the panel 20. The hollow squares 36 and 38 correspond to the rings 24 and 26 of Fig. 3 and they are preferably of an equivalent thickness and spaced from each other and from the center spot 34 by equivalent areas substantially devoid of insulation material. For instance, the dimension of the outer sides of the outer hollow square 38 corresponds to the diameter of the outer ring 26 in Fig. 3, in other words it is preferably equal to three-quarters of the dimension of the sides of the panel 20.

In Fig. 6 instead of providing wholly disconnected areas of insulation, the equivalent result is obtained by providing a more or less circular central spot 44, equivalent to the disc 22 in Fig. 3, and a strip 46 of insulation material arranged in spiral relation with respect thereto and extending outwardly therefrom. Preferably the spot 44 is of a size corresponding with the size of the disc 22 in Fig. 3, the thickness of the strip 46 measured in a direction radially from the center of the spot 44 is equivalent to the thickness of the rings 24 and 26 of Fig. 3, and the spacing between the adjacent convolutions of the spiral strip 46 is preferably equivalent to the spacing of the rings 24 and 26 in Fig. 3. It will be appreciated that a substantially equivalent result to that obtained in the construction shown in Fig. 3 will be obtained.

In Fig. 7 an arrangement essentially similar to that shown in Fig. 3 is provided including a central disc 22 which may be identical to the disc 22 in Fig. 3 and outwardly spaced rings 24a and 26a, respectively, arranged in identically the same manner as the rings 24 and 26 in Fig. 3 with respect to each other and to the central disc or spot 22, but in this case being of interrupted character circumferentially thereof. In other words the ring 24a is shown as being broken up into four sector-like portions by breaks 24b and the outer ring 26a broken up into four sectors by breaks 26b. In such case the breaks 24b and 26b are preferably arranged in staggered relationship circumferentially of the disc or spot 22 in the manner illustrated.

In Fig. 8 a still different arrangement is shown. As a matter of illustration the center spot in this case is illustrated as being identical to the center spot 22 in the construction shown in Figs. 3 and 7, but the strips of insulation in this case are shown as curved areas 50 arranged with their concave edges outwardly from the center of the spot 22. The thickness of the areas 50 may be equivalent to the thickness of the rings 24 and 26 in Fig. 3 and they may be spaced from each other by equivalent distances. With this arrangement the outer areas 50 may be extended into closer proximity to the corners of the panel 20 than in the constructions previously disclosed, with the possible exception of the construction shown in Fig. 5, if desired and as indicated.

It will be appreciated that the modifications shown in Figs. 5 to 8, inclusive, are merely examples of the wide range of shapes and arrangements of strips or areas of insulation that may be applied to such panels in accordance with the present invention and, accordingly, that formal changes may be made in the specific arrangements of the invention described without departing from the spirit or substance of the broad invention, the scope of which is commensurate with the appended claims.

What I claim is:

1. A vibration damped structure comprising, in combination, a relatively thin sheet metal vibratile panel, and an adherent coating of vibration damping material forming a unitary part thereof and arranged to provide a spot of material area positioned centrally of said panel and strips outwardly therefrom arranged about said spot as a center and spaced from one another radially of said central spot in all directions, and from said central spot, by areas substantially free of said material.

2. A vibration damped structure comprising, in combination, a relatively thin sheet metal vibratile panel, and an adherent coating of vibration damping material forming a unitary part thereof and arranged to provide a spot of material area positioned centrally of said panel and having a minimum dimension approximately equal to one-fourth the average width of said panel, and strips of said material outwardly in all directions radially therefrom spaced from one another and from said central spot by areas substantially free of said material.

3. A vibration damped structure comprising, in combination, a relatively thin sheet metal vibratile panel, and an adherent coating of vibration damping material forming a unitary part thereof and arranged to provide a spot of material area positioned centrally of said panel and strips of said material outwardly therefrom arranged about said spot as a center and radially spaced from one another and from said central spot by areas substantially free of said material, the width of said strips being approximately equal to one-sixteenth of the average width dimension of said panel.

4. A vibration damped structure comprising, in combination, a relatively thin sheet metal vibratile panel, and an adherent coating of vibration damping material forming a unitary part thereof and arranged to provide a spot of material area positioned centrally of said panel and strips of said material outwardly therefrom arranged about said spot and disposed transversely of substantially all lines radiating from said spot, said strips being spaced from one another and from said central spot by areas substantially free of said material, and the spacing between said strips being approximately equal to the width of said strips.

5. A vibration damped structure comprising, in combination, a relatively thin sheet metal vibratile panel, and an adherent coating of vibration damping material forming a unitary part thereof and arranged to provide a spot of material area positioned centrally of said panel and strips of said material outwardly therefrom arranged about said spot in intersecting relation to substantially all lines radiating from said spot and spaced from one another and from said central spot by areas substantially free of said material, the width of said strips being approximately equal to one-sixteenth of the average width of said panel and the spacing between said strips being approximately equal to the width of said strips.

6. A vibration damped structure comprising, in combination, a relatively thin sheet metal vibratile panel, and an adherent coating of vibration damping material forming a unitary part thereof and arranged to provide a central spot and a plurality of surrounding continuous strips arranged about said spot as a center in spaced relation with respect to each other and to said central spot by areas of substantial width substantially devoid of insulation material.

7. A vibration damped structure comprising, in combination, a relatively thin sheet metal vibratile panel, and an adherent coating of vibration damping material forming a unitary part thereof and arranged to provide a central spot and concentric rings spaced from said spot and from each other by areas substantially devoid of said material.

8. A vibration damped structure comprising, in combination, a relatively thin sheet metal vibratile panel, and an adherent coating of vibration damping material forming a unitary part thereof and arranged to provide a central spot and concentric rings spaced from said spot and from each other by areas substantially devoid of said material, said central spot having a diameter approximately equal to one-fourth of the width of said panel.

9. A vibration damped structure comprising, in combination, a relatively thin sheet metal vibratile panel, and an adherent coating of vibration damping material forming a unitary part thereof and arranged to provide a central spot and concentric rings spaced from said spot and from each other by areas substantially devoid of said material, said central spot having a diameter approximately equal to one-fourth of the width of said panel, and said rings each being of a width approximately equal to one-sixteenth of the width of said panel.

FRANK M. SMITH.